United States Patent [19]

Stephenson, III

[11] Patent Number: 5,640,637
[45] Date of Patent: Jun. 17, 1997

[54] APPARATUS AND METHOD FOR MOVING FILM

[75] Inventor: Stanley Ward Stephenson, III, Spencerport, N.Y.

[73] Assignee: Eastman Kodak Company, Rochester, N.Y.

[21] Appl. No.: 370,086

[22] Filed: Jan. 9, 1995

[51] Int. Cl.$^6$ ..................................................... G03B 1/18
[52] U.S. Cl. ......................................................... 396/411
[58] Field of Search ................................. 354/212, 213, 354/214, 215, 173.1, 173.11

[56] References Cited

U.S. PATENT DOCUMENTS

| | | | |
|---|---|---|---|
| 1,144,934 | 6/1915 | Cutler | 354/212 |
| 4,474,443 | 10/1984 | Komatsuzaki et al. | 354/212 |
| 4,548,304 | 10/1985 | Nagata | 354/173.1 X |
| 4,589,604 | 5/1986 | Yagi et al. | 354/214 X |
| 4,855,773 | 8/1989 | Harvey | 354/173.1 |
| 4,967,213 | 10/1990 | Han | 354/173.1 |
| 5,231,438 | 7/1993 | Smart | 354/281 |
| 5,287,136 | 2/1994 | Kitagawa et al. | 354/173.1 |
| 5,353,078 | 10/1994 | Aoshima | 354/105 |
| 5,357,302 | 10/1994 | Kawamura et al. | 354/213 |
| 5,437,416 | 8/1995 | Ezawa et al. | 354/212 X |

FOREIGN PATENT DOCUMENTS

| | | |
|---|---|---|
| 2067535 | 7/1990 | Japan . |
| 4069634 | 4/1992 | Japan . |

*Primary Examiner*—Howard B. Blankenship
*Attorney, Agent, or Firm*—Peter J. Bilinski

[57] ABSTRACT

An apparatus including a camera body adapted to receive a thrust film cartridge, a thrust spindle for engagedly receiving a thrust cartridge spool, a take-up spool, and a mechanism for simultaneously driving both the thrust spindle and the take-up spool in an advance direction such that a surface speed of the take-up spool is faster than a surface speed of film being thrust from the thrust cartridge. A first one-way clutch is operatively positioned between a drive mechanism and the thrust spindle, and a second one-way clutch is operatively positioned between the drive mechanism and the take-up spool. A rewind spindle engagedly receives the thrust cartridge spool, and a rewind mechanism drives the rewind spindle in a rewind direction. A third clutch is operatively positioned between the rewind knob and the rewind spindle.

18 Claims, 4 Drawing Sheets

APPARATUS AND METHOD FOR MOVING FILM

FIELD OF THE INVENTION

The present invention generally relates to the field of photographic cameras and, more specifically, to mechanisms for loading, advancing and rewinding film between the cartridge spool and the take-up spool, particularly in connection with thrust film cartridges.

BACKGROUND OF THE INVENTION

In one type of conventional unused film cartridge, film is wrapped around a spool within the cartridge, and the end of the film extends from the cartridge to facilitate loading of the film into a camera. To load the film, the camera is opened and the cartridge is inserted into a cartridge compartment in the camera. The end of the film is then grabbed by the user and placed into the film track. When the camera is closed, the film is pulled from the cartridge frame by frame and rolled onto a take-up spool, as is generally known in the art.

Recently, a new type of film cartridge, a "thrust cartridge", has been developed wherein the film is capable of being thrust out of the cartridge by rotating the cartridge spool in the appropriate direction. This feature allows the film within a cartridge to be completely enclosed within the cartridge, rather than having the end of the film extending therefrom. In addition, partially used film can be rewound into the cartridge and then used at a later date by thrusting the film from the cartridge and advancing the film to the next unexposed frame. Specifics regarding the structure and operation of one type of thrust cartridge can be found in commonly-assigned U.S. Pat. No. 5,231,438, to Smart, which is incorporated herein by reference in its entirety.

When loading thrust cartridges, the cartridge is placed into the camera and the camera door is closed to prevent light from entering the camera and exposing the film. The cartridge spool is then rotated in the appropriate direction to thrust the film from the cartridge and through the film track. Once the film reaches the end of the film track, it is engaged by the take-up roll. Thereafter, a transfer of drive power occurs between the cartridge spool and the take-up spool. That is, the thrusting of the film by the cartridge spool is deactivated, and further movement of the film is provided by a pulling action of the take-up spool. When rewinding of the film into the cartridge is desired, drive power is provided by the cartridge spool by rotating the cartridge spool in the appropriate direction to rewind the film.

U.S. Pat. No. 5,287,136 to Kitagawa et al. discloses a camera that automatically advances and rewinds a thrust film cartridge. To thrust film from the cartridge, a controller directs a motor to drive the cartridge spool in the advance direction to thrust film from the cartridge. Once the film is advanced into engagement with the take-up spool, the controller actively directs the motor to stop driving the cartridge spool and to commence driving the take-up spool. When rewind of the film is desired, the controller directs to motor to stop driving the take-up spool and to commence driving the cartridge spool in the rewind direction. To perform the various drive functions, the described camera utilizes a combination of a reversible motor, two on/off clutches, and a controller for selectively activating and deactivating the motor and the clutches. Such use of expensive electronic components essentially limits the use of such a device to high-end automatic cameras.

With the recent popularity of inexpensive, manually-wound cameras (e.g., single use cameras), it is typically desirable to design new camera mechanisms to be useable therewith. Accordingly, it can be appreciated that it would be desirable to provide a simple, inexpensive mechanism for rotating a thrust cartridge spool to thrust film from the cartridge, while also providing for take-up spool rotation to engage and advance the film. In addition, the cartridge spool should be rotatable in the opposite direction to facilitate rewinding the film back into the cartridge after a desired portion of the film is exposed.

SUMMARY OF THE INVENTION

In accordance with the present invention, an apparatus for moving film is provided which achieves one or more of the above-stated objectives. The apparatus generally includes a camera body adapted to receive a thrust film cartridge, a thrust spindle for engagedly receiving a thrust cartridge spool, a take-up spool, and a drive mechanism (e.g., a thumb wheel or ratchet lever) for simultaneously driving both the thrust spindle and the take-up spool in a thrust direction such that a surface speed of the take-up spool is faster than a surface speed of film being thrust from the thrust cartridge. By virtue of the present invention, film from a thrust cartridge can be loaded into a camera by the action (e.g., rotation or sliding) of a single element (e.g., a thumb wheel, ratchet lever or slide button) and without the need to actively change the advancing mechanism from the cartridge spool to the take-up spool. That is, such change is done without the need for a specific action on the part of the user or on the part of the camera. Preferably, the film may be rewound by the action of a single element (e.g., a rewind knob) without the need to actively engage the rewind mechanism or to disengage the advancing mechanism.

In one embodiment, the drive mechanism includes a drive wheel operatively interconnected with both the thrust spindle and the take-up spool, and a first one-way clutch operatively connected to the drive wheel and the thrust spindle to allow the drive wheel to drive the thrust spindle in the thrust direction while substantially preventing the drive wheel from driving the thrust spindle in a rewind direction. For example, the first clutch may include a driver element operatively associated with the drive wheel and a follower element operatively associated with the thrust spindle. In addition, the drive mechanism may further include a second one-way clutch operatively connected to the drive wheel and the take-up spool to allow the drive wheel to drive the take-up spool in the thrust direction while substantially preventing the drive wheel from driving the take-up spool in the rewind direction. The second clutch may include a driver element operatively associated with the drive wheel and a follower element operatively associated with the take-up spool.

In order to provide synchronous motion of the first and second clutches, the drive mechanism preferably includes a direct mechanical interconnection between the first clutch and the second clutch. For example, such direct mechanical interconnection may be selected from the group consisting of a belt, a chain and a gear train. In addition, the present invention is particularly applicable to manual cameras wherein the drive mechanism is manually driven.

In another embodiment, the apparatus further includes a rewind spindle for engagedly receiving a thrust film cartridge spool, and a rewind mechanism (e.g., a rewind knob) for driving the rewind spindle in a rewind direction. In this embodiment, the apparatus may further include a third clutch operatively positioned between the rewind mechanism and the rewind spindle to allow the rewind mechanism to drive the rewind spindle in the rewind direction while substantially preventing the rewind mechanism from driving the rewind spindle in the thrust direction.

In another aspect of the present invention, a method for moving film out of a thrust cartridge is provided. The method is particularly applicable to thrust cartridges having cartridge spool and being loaded into a camera having a take-up spool. The method generally includes the steps of inserting a thrust cartridge into a camera body, rotating the cartridge spool in a thrust direction to thrust film from the cartridge at a first speed, and rotating the take-up spool (i.e., simultaneously with the step of rotating the cartridge spool) in a thrust direction such that a surface of the take-up spool is at a second speed greater than the first speed. By virtue of its greater surface speed, the take-up spool will engage the film and automatically take over as the advancing mechanism.

In one embodiment, the method further includes the steps of moving the film toward the take-up spool, securing the film to the take-up spool, and accelerating the rotational speed of the cartridge spool relative to the rotational speed of the take-up spool such that the first speed of the film from the cartridge is about equal to the surface speed of the take-up roll. This embodiment works particularly well when the cartridge spool and take-up spool are operatively interconnected with first and second one-way clutches, respectively, and when the first and second clutches are operatively interconnected with a manual drive mechanism. Utilizing such a configuration of elements, the steps of rotating the cartridge spool and rotating the take-up spool preferably include the steps of moving the drive mechanism and engaging the first and second clutches. Further, the step of accelerating may include the step of disengaging the first clutch. Preferably, the steps of rotating the cartridge spool and the take-up spool are performed manually.

In another embodiment, the method further includes the step of rotating the cartridge spool in a rewind direction to rewind the film into the cartridge. During such rotating of the cartridge spool in the rewind direction, the second clutch can be disengaged.

In yet another aspect of the present invention, an apparatus for moving film is provided. The apparatus includes a camera body adapted to receive a thrust film cartridge, a thrust spindle for engagedly receiving a thrust cartridge spool, a take-up spool, a manual advancing mechanism (e.g., a ratchet lever, a drive wheel or a slide button) accessible from an exterior of the camera body and operatively interconnected with the thrust spindle for allowing manual rotation of the thrust spindle in an advance direction to provide film advance, and a mechanism for transferring film advance from thrusting action of the thrust spindle to a pulling action of the take-up spool. The recited apparatus advantageously provides a mechanism which allows manual advancing of film from a thrust cartridge, and also facilitates transferring film advance from the thrusting by the cartridge spool to pulling by the take-up spool.

In one embodiment, the manual advancing mechanism includes a drive mechanism operatively interconnected with both the thrust spindle and the take-up spool. A first one-way clutch is operatively positioned between the drive mechanism and the thrust spindle to allow the drive mechanism to drive the thrust spindle in the advance direction while substantially preventing the drive mechanism from driving the thrust spindle in a rewind direction. In addition, a second one-way clutch is operatively positioned between the drive mechanism and the take-up spool to allow the drive mechanism to drive the take-up spool in the advance direction while substantially preventing the drive mechanism from driving the take-up spool in the rewind direction.

In another embodiment, the apparatus further includes a rewind spindle for engagedly receiving the thrust film cartridge spool, and a rewind mechanism for allowing manual driving of the rewind spindle in the rewind direction. The apparatus may further include a third one-way clutch operatively positioned between the rewind mechanism and the rewind spindle to allow the rewind mechanism to drive the rewind spindle in the rewind direction while substantially preventing the rewind mechanism from driving the rewind spindle in the advance direction.

BRIEF DESCRIPTION OF THE DRAWINGS

FIGS. 5 (a) and 5(b) are exploded assembly perspective views of alternate embodiments of the present invention.

DETAILED DESCRIPTION

Figure 1:
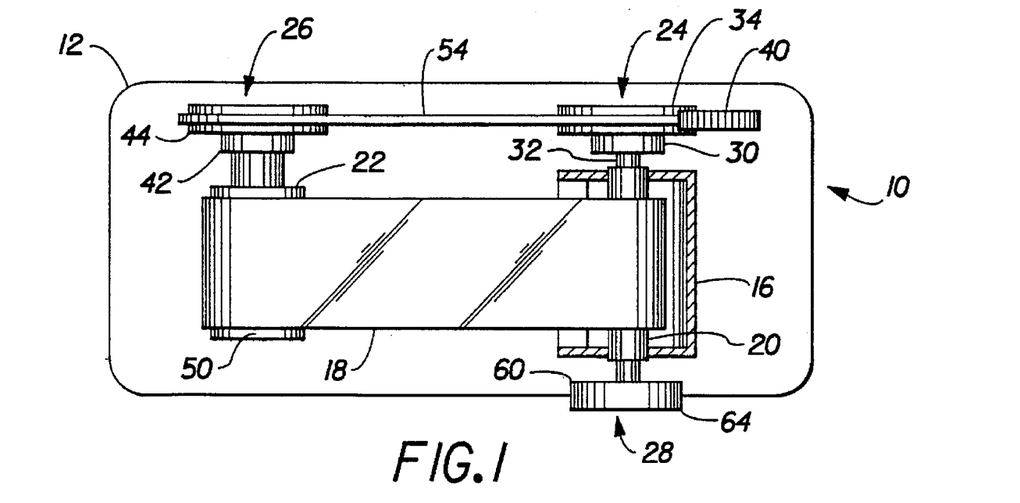
FIG. 1 is a schematic back elevation view of a camera embodying the present invention.
Figure 2:
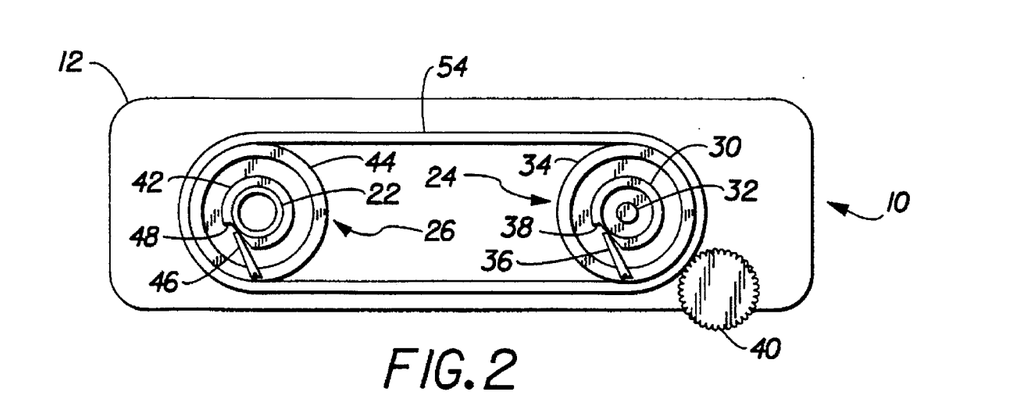
FIG. 2 is a schematic top plan view of the camera illustrated in FIG. 1.
Figure 3:
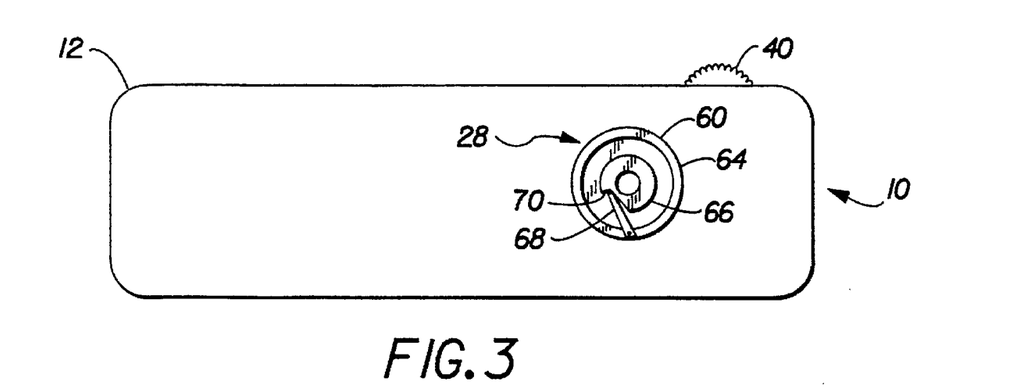
FIG. 3 is a schematic bottom plan view of the camera illustrated in FIG. 1.

An embodiment of the present invention is illustrated in FIGS. 1–3. The apparatus 10 includes a camera body 12 adapted to receive a thrust film cartridge 16 and allowing for the passage of film 18 from a cartridge spool 20 in the cartridge 16 to a take-up spool 22 in the camera. First and second clutches 24, 26 are operatively associated with each other and with the cartridge and take-up spools 20,22, respectively. A third clutch 28 is associated with the cartridge spool 20 to facilitate unidirectional rewinding of the film 18 from the take-up spool 22 to the cartridge spool 20. The illustrated apparatus 10 provides a mechanism which initially utilizes the rotation of the cartridge spool 20 as the advancing mechanism for advancing the film 18 from the thrust cartridge 16 to initiate film loading, and subsequently switches to utilize the take-up spool 22 as the advancing mechanism for advancing film. In addition, the film 18 can be rewound onto the cartridge spool 20 after film exposure is complete without the need to manually disengage the take-up spool 22.

As used herein, the direction of movement of components corresponding with movement of the film 18 out of the cartridge 16 is referred to as "the advance direction," and corresponds with movement of film 18 from right to left in FIGS. 1–3. Correspondingly, the opposite direction of components (i.e., corresponding with movement of film 18 into the cartridge 16) is referred to as "the rewind direction," and corresponds with movement of film 18 from left to right in FIGS. 1–3. In addition, unless otherwise specifically noted, the terms "clockwise" and "counter-clockwise" refer to rotation of the components as viewed from the top of the camera, as illustrated in FIG. 2. Furthermore, use of the term "surface speed" refers to the speed at which the outer-most surface of a spool is rotating, and is intended to include the speed of the outer-most layer of film 18 which may be wound onto a spool.

Referring specifically to FIG. 2, the first clutch 24 is a one-way clutch comprising a first inner ring 30 secured to a thrust spindle 32 which is engageable with the cartridge spool 20, and a first outer ring 34 rotatable about the first inner ring 30. The first clutch 24 is designed such that rotation of the first outer ring 34 in the advance direction results in rotation of the first inner ring 30 and associated thrust spindle 32 in the advance direction. To accomplish this, the illustrated embodiment includes a first pawl 36 secured to the first outer ring 34 and positioned such that it engages a first notch 38 in the first inner ring 30 to drive the first inner ring 30 in only the clockwise direction. If the first outer ring 34 is driven in the counter-clockwise direction, the first pawl 36 will slip over the first notch 38 and will not cause rotation of the first inner ring 30. Accordingly, when the first outer ring 34 is rotated in the clockwise direction, the first outer ring 34 acts as a "driver element" and the first inner ring 30 acts as a "follower element."

The first outer ring 34 is operatively associated with a thumb wheel 40 such that counter-clockwise rotation of the thumb wheel 40 will result in clockwise rotation of the first outer ring 34. It should be appreciated that other forms and orientations of clutches could be utilized to accomplish the same function. In addition, other manual driving mechanisms other than a drive wheel could be utilized, such as a ratchet lever or a slide button.

Similar to the first clutch 24, the second clutch 26 is a one-way clutch comprising a second inner ring 42 secured to the take-up spool 22, and a second outer ring 44 rotatable about the second inner ring 42. The second clutch 26 is designed such that rotation of the second outer ring 44 in the advance direction results in rotation of the second inner ring 42 and associated take-up spool 22 in the advance direction. To accomplish this, the illustrated embodiment includes a second pawl 46 secured to the second outer ring 44 and positioned such that it engages a second notch 48 in the second inner ring 42 to drive the second inner ring 42 in only the clockwise direction. If the second outer ring 44 is driven in the counter-clockwise direction, the second pawl 46 will slip over the second notch 48 and will not cause rotation of the second inner ring 42. Accordingly, when the second outer ring 44 is rotated in the clockwise direction, the second outer ring 44 acts as a "driver element" and the second inner ring 42 acts as a "follower element." As with the first clutch 24, it should be appreciated that other forms and orientations of clutches could be utilized to accomplish the same function.

The take-up spool 22 includes an engaging mechanism for engaging the film 18 when the film 18 is presented thereto. That is, the take-up spool 22 is capable of engaging the leading edge of the film 18 and thereby roll the film 18 onto the take-up spool 22. In the illustrated embodiment, the engaging mechanism includes a high friction rubber surface 50 on the take-up spool 22 and a corresponding roller (not shown). The roller presses the film 18 to the rubber surface 50 to thereby create sufficient friction to allow engagement between the take-up spool 22 and the film 18. It should be appreciated, however, that other engaging mechanisms could be used instead.

Figure 4:
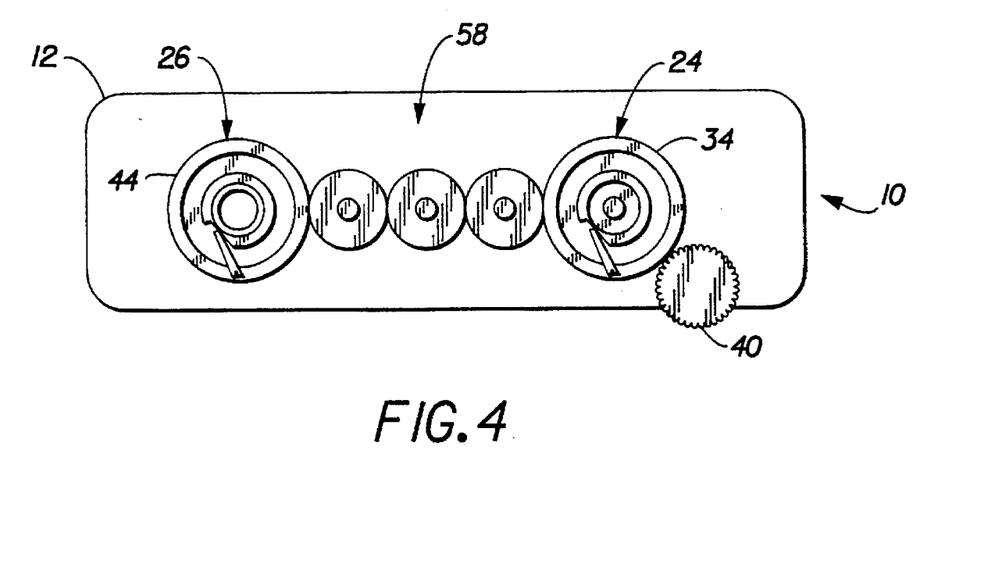
FIG. 4 is a schematic top plan view of an alternative embodiment of the present invention.

The apparatus 10 further includes a coupling mechanism for coupling the rotation of the first outer ring 34 to the rotation of the second outer ring 44. For example, a drive belt 54, drive chain or gear train can be used. Due to its low cost, the illustrated embodiment utilizes a drive belt 54 comprising an injection molded thermoplastic elastomer with teeth (not shown) formed therein for engagement with teeth (not shown) on the first and second outer rings 34, 44. Since, in the illustrated embodiment, the outer rings of the first and second clutches 24, 26 are of equal diameter, the first and second outer rings 34, 44 will rotate at the same rotational speed. An alternative embodiment utilizing a gear train 58 is illustrated in FIG. 4. The gear train 58 comprises three gears in meshing engagement with each other and with the first and second outer rings 34, 44. It should be appreciated that any appropriate number of gears may be utilized. However, the use of an odd number of gears is preferred since it results in the first and second outer rings 34, 44 rotating in the same direction.

Another feature of the present invention is the fact that the surface speed of the take-up spool 22 (i.e., the speed of the outer-most surface of the take-up spool 22, corresponding with the speed at which film 18 will be wound thereon) in the advance direction is greater than the surface speed of the cartridge spool 20 during thrusting of the film 18 from the cartridge 16 and before engagement of the film 18 by the take-up spool 22. That is, the relative rotational speeds of the take-up spool 22 and cartridge spool 20, in combination with the relative diameters of the spools, are designed such that the take-up spool 22 will always have a higher surface speed than the speed at which film 18 is thrust from the cartridge spool 20 during thrusting of the film 18. This feature, along with the proper orientation and positioning of the first clutch 24, allows for the loading of film 18 into the camera without the need to actively transfer drive power from the thrust action of the cartridge spool 20 to the pulling action of the take-up spool 22, as is described below in more detail.

In the illustrated embodiment, as noted above, the clutches are interconnected such that the rotational speeds of their outer rings are identical. Accordingly, in order to have the surface speed of the take-up spool 22 be higher than the surface speed of the cartridge spool 20, the take-up spool 22 has a diameter which is larger than the maximum effective diameter of the cartridge spool 20 (i.e., larger than the diameter of a full roll of film 18 positioned on the cartridge spool 20). It should be appreciated that other configurations could be used to achieve the same result. For example, the take-up spool 22 could be smaller in diameter than the cartridge spool 20, and the clutches could be designed such that the second clutch 26 rotates faster than the first clutch 24 to make up the difference.

In operation, the following sequence of events will occur during loading and advancing of the film 18. First, the thumb wheel 40 is manually rotated in the counter-clockwise direction to cause rotation of the first outer ring 34 and the first inner ring 30 in the clockwise direction. Since the first inner ring 30 is secured to the thrust spindle 32, which is engaged with the cartridge spool 20, the cartridge spool 20 will similarly be rotated in the clockwise direction. Such clockwise rotation of the cartridge spool 20 will result in film 18 being thrust out of the cartridge 16 and toward the take-up spool 22. It should be noted that rotation of the thumb wheel 40 in the opposite (i.e., clockwise) direction will not result in counter-clockwise rotation of the first inner ring 30 due to the orientation of the first clutch 24.

Clockwise rotation of the first outer ring 34 causes clockwise rotation of the second outer ring 44 due to the operational interconnection provided by the belt. Such clockwise rotation of the second outer ring 44 causes clockwise rotation of the second inner ring 42 and the associated take-up spool 22. Because of the larger diameter of the take-up spool 22 compared to the diameter of the film roll on the cartridge spool 20, the surface speed of the take-up spool 22 is faster than the speed at which the film 18 in thrust from the cartridge 16. Upon presentation of the leading edge of the film 18 thereto, the take-up spool 22 will engage the film 18 (e.g., due to the roller and the rubber surface 50) and initiate winding of the film 18 thereon. Since the surface speed of the take-up spool 22 is faster than the thrust speed of the cartridge spool 20, the take-up spool 22 will pull the film 18 faster than the cartridge spool 20 thrusts the film 18 (i.e., the cartridge spool 20 will need to rotate at a faster rotational speed than that of the take-up spool 22). This is accommodated by the presence of the first clutch 24. More specifically, as can be seen in FIG. 2, the cartridge spool 20 (and the associated thrust spindle 32 and first inner ring 30) will be allowed to rotate in the clockwise direction at a faster rotational speed than the first outer ring 34 due to the slipping of the first pawl 36. Accordingly, when the take-up spool 22 engages and pulls the film 18, the advancing mechanism for advancing the film 18 is automatically transferred from the cartridge spool 20 to the take-up spool 22.

To accommodate rewinding of the film 18, the camera preferably includes a rewind knob 60 operatively connected to the cartridge spool 20 via a third clutch 28, as illustrated in FIGS. 1 and 3. The rewind knob 60 of the illustrated embodiment is integral with the a third outer ring 64 of the third clutch 28, and a third inner ring 66 of the third clutch 28 is engaged with the cartridge spool 20. The third clutch 28 is designed such that rotation of the third outer ring 64 in the rewind direction (i.e., by rotating the rewind knob 60 in the rewind direction) results in rotation of the third inner ring 66 and associated cartridge spool 20 in the rewind direction. To accomplish this, the illustrated embodiment includes a third pawl 68 secured to the third outer ring 64 and positioned such that it engages a third notch 70 in the third inner ring 66 to drive the third inner ring 66 in only the rewind direction (clockwise in FIG. 3). If the third outer ring 64 is driven in the advance direction (counter-clockwise in FIG. 3), the third pawl 68 will slip over the third notch 70 and will not cause rotation of the third inner ring 66. Thus, the rewind knob 60 cannot be used to thrust the film 18 from the film cartridge 16. As with the first and second clutches 24, 26, it should be appreciated that other forms and orientations of clutches could be utilized to accomplish the same function.

When it is desired to rewind the film 18 back into the cartridge 16, the rewind knob 60 must be manually rotated in the rewind direction, resulting in counter-clockwise rotation (i.e., viewed from the top in FIG. 2) of the cartridge spool 20. Such counter-clockwise rotation of the cartridge spool 20 will cause the film 18 to be wound thereon. The rotation of the cartridge spool 20 also causes counter-clockwise rotation of the first inner ring 30 which, due to the first pawl 36 and belt, causes counter-clockwise rotation of the first and second outer rings 34, 44. It should be noted that, because of the smaller diameter of the cartridge spool 20 compared to the take-up spool 22, the take-up spool 22 (i.e., and the associated second inner ring 42) will need to rotate at a slower rotational speed than that of the cartridge spool 20. This difference in rotational speeds is accommodated by the orientation of the second clutch 26. More specifically, it can be seen in FIG. 2 that counter-clockwise rotation of the second outer ring 44 will not drive the second inner ring 42. therefore, the second inner ring 42 is free to rotate at a slower speed than that of the first and second outer rings 34, 44 and the cartridge spool 20.

Figure 5A:
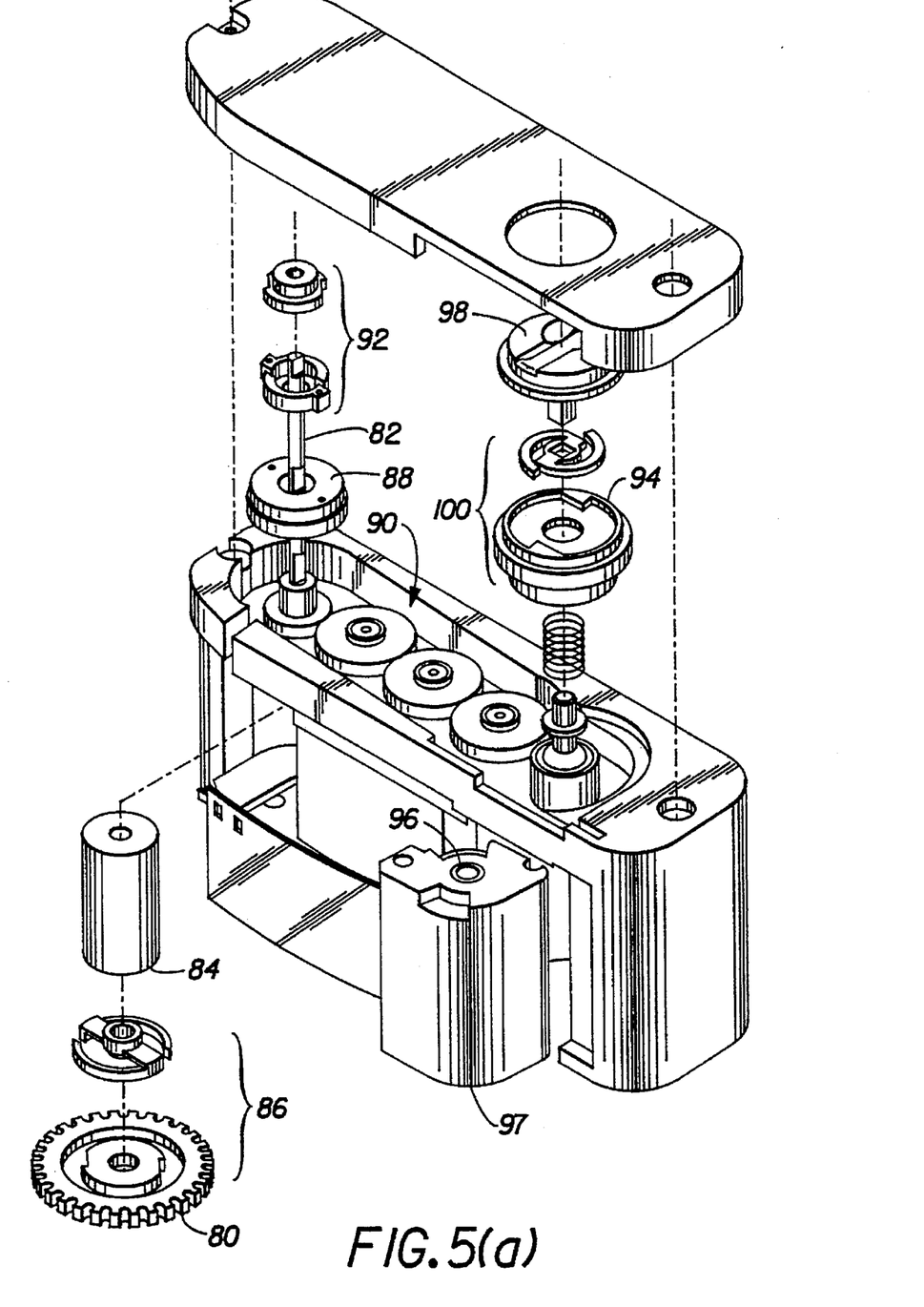

In an alternative embodiment of the present invention, illustrated in FIG. 5(a) a single clutch is utilized to transfer the advancing mechanism for advancing the film from the cartridge spool to the take-up spool. More specifically, the illustrated apparatus includes a drive wheel 80 for driving a take-up spindle 82 and associated take-up spool 84 in a clockwise direction (i.e., when viewed from the top of the camera in FIG. 5). Such driving occurs through a one-way drive clutch 86 such that the drive wheel can only drive the take-up spool 84 in one direction. The take-up spindle 82 drives a take-up gear 88 and associated gear train 90 through a one-way transfer clutch 92, resulting in clockwise rotation of a thrust gear 94 and associated thrust spool 96 within the thrust cartridge 97. Accordingly, clockwise rotation of the drive wheel 80 results in thrusting of film from the thrust cartridge 97.

Similar to the previously-described embodiment, the apparatus is designed such that the surface speed of the take-up spool 84 is faster than the speed of film being thrust from the thrust cartridge. Consequently, when the film reaches and is engaged by the take-up spool 84, the take-up spool 84 will pull the film faster than the thrust spool 96 thrusts the film, thereby transferring the advancing mechanism from the thrusting of the thrust spool 96 to the pulling of the take-up spool 84. A result of such engaging and pulling by the take-up spool is that the thrust spool 96 and associated gear train 90 will accelerate relative to the take-up spool 84. The relative acceleration is accommodated by the presence of the transfer clutch 92 which allows the gear train 90 to move at a faster speed than the take-up spool 84, thereby disengaging the transfer clutch 92. It should be appreciated that, in the illustrated embodiment, the acceleration of the thrust spool 96 and disengagement of the transfer clutch 92 occur naturally due to the pulling action of the take-up spool 84, and without the need to actively perform such acceleration and/or disengagement.

A rewind mechanism 98 is operatively associated with the thrust spool 96 through a one-way rewind clutch 100 to allow rotation of the thrust spool 96 in the rewind direction. The rewind clutch 100 prevents thrusting of the film from the cartridge utilizing the rewind mechanism 98. Similarly, the drive clutch 86 is used to prevent utilization of the drive wheel for moving the film in the rewind direction.

It should be noted that the embodiment illustrated in FIG. 5 (a) does not include a clutch for accommodating the difference in surface speed between the take-up spool 84 and thrust spool 96 during rewind. Accordingly, during rewind, the take-up spool 84 will have a higher surface speed than the thrust spool 96, thereby resulting in unraveling of the film from the take-up spool 84. However, such unraveling has been unexpectedly found not to cause failure of the camera and/or damage to the film. Therefore, it has been found that the utilization of a single one-way drive clutch 86 to accommodate thrusting and pulling of film is within the scope of the present invention.

Figure 5B:
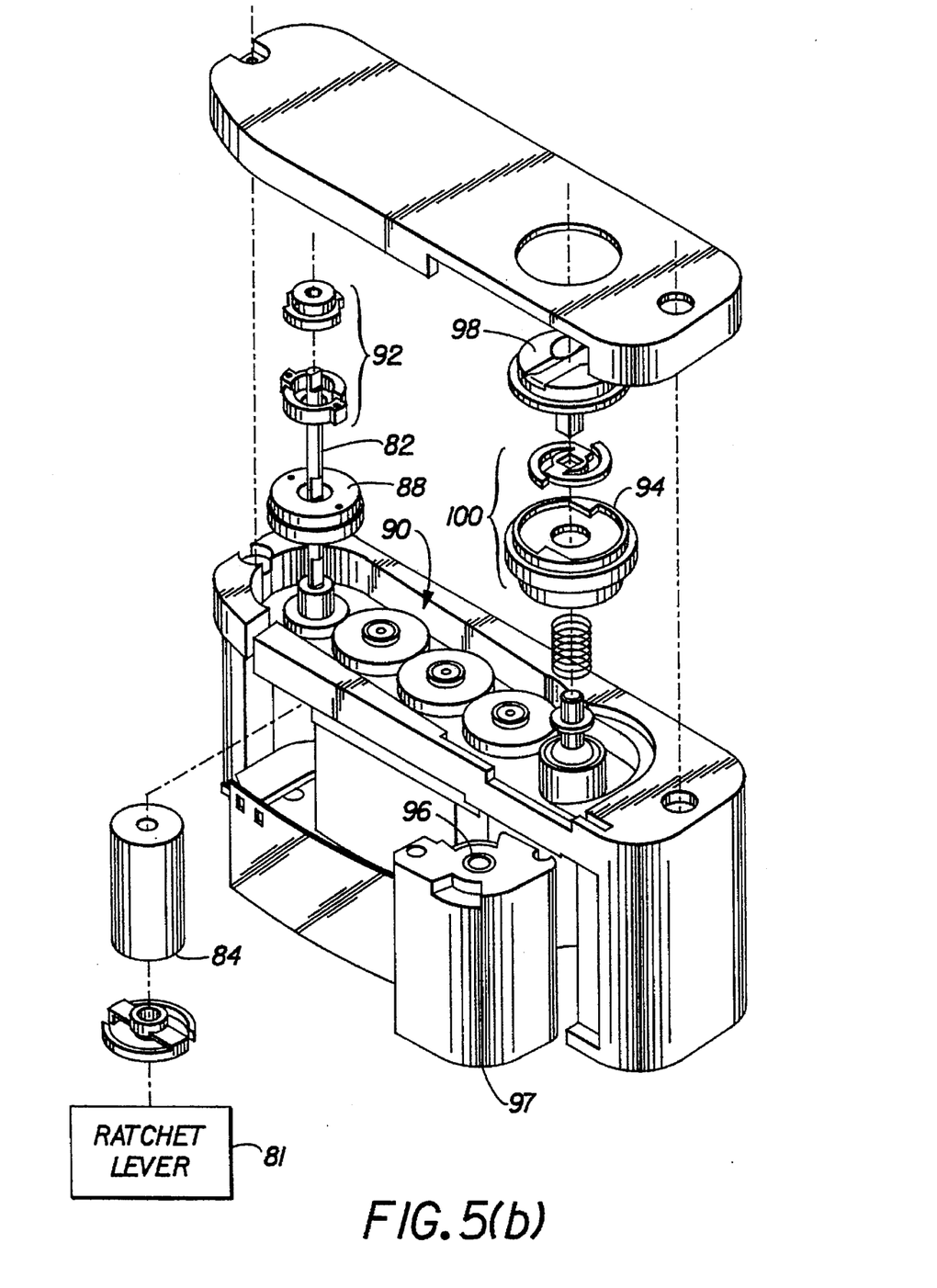

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. For example, rather than using the drive wheel 80 to drive the take-up spindle 82 and associated take-up spool 84, other manual drive means, such as ratchet lever 81, can be used as shown in FIG. 5(b). The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

ELEMENTS IDENTIFIED BY REFERENCE NUMERAL

| Reference Numeral | Element |
| --- | --- |
| 10 | apparatus |
| 12 | camera body |
| 14 | cartridge compartment |
| 16 | cartridge |
| 18 | film |
| 20 | cartridge spool |
| 22 | take-up spool |
| 24 | first clutch |
| 26 | second clutch |
| 28 | third clutch |
| 30 | first inner ring |
| 32 | thrust spindle |
| 34 | first outer ring |
| 36 | first panel |
| 38 | first notch |
| 40 | thumb wheel |
| 42 | second inner ring |
| 44 | second outer ring |
| 46 | second panel |
| 48 | second notch |
| 50 | rubber surface |
| 52 | roller |
| 54 | drive belt |
| 56 | film track |
| 58 | gear train |
| 60 | rewind knob |
| 62 | third clutch |
| 64 | third outer ring |
| 66 | third inner ring |
| 68 | third panel |
| 70 | third notch |
| 80 | drive wheel |
| 82 | take-up spidle |
| 84 | take-up spool 81 ratchet lever |
| 86 | drive clutch |
| 88 | take-up aear |
| 90 | gear train |
| 92 | transfer clutch |
| 94 | thrust gear |
| 96 | thrust spool |
| 97 | thrust cartridge |
| 98 | rewind mechanism |
| 100 | rewind clutch |

What is claimed is:

1. An apparatus for moving film comprising:

(a) a camera body adapted to receive a thrust film cartridge;

(b) a thrust spindle for engagedly receiving a thrust cartridge spool;

(c) a take-up spool; is characterized by:

(d) means for simultaneously driving both said thrust spindle and said take-up spool in an advance direction such that a surface speed of said take-up spool is faster than a surface speed of said film being thrust from a thrust cartridge positioned in said camera body, wherein said means for simultaneously driving comprises:

(i) a drive mechanism operatively interconnected with both said thrust spindle and said take-up spool: and (ii) a first one-way clutch operatively interconnecting said drive mechanism with said thrust spindle and capable of driving said thrust spindle in said advance direction and not capable of driving said thrust spindle in a rewind direction.

2. An apparatus, as claimed in claim 1, wherein said means for simultaneously driving further comprises a second one-way clutch operatively interconnecting said drive mechanism with said take-up spool and capable of driving said take-up spool in said advance direction and not capable of driving said take-up spool in said rewind direction.

3. An apparatus, as claimed in claim 2, wherein said first clutch comprises a driver element operatively associated with said drive mechanism and a follower element operatively associated with said thrust spindle.

4. An apparatus, as claimed in claim 2, wherein said second clutch comprises a driver element operatively associated with said drive mechanism and a follower element operatively associated with said take-up spool.

5. An apparatus, as claimed in claim 2, wherein said means for simultaneously driving comprises a direct mechanical interconnection between said first clutch and said second clutch.

6. An apparatus, as claimed in claim 5, wherein said direct mechanical interconnection is a belt.

7. An apparatus, as claimed in claim 1, further comprising:

(i) a rewind spindle for engagedly receiving a thrust film cartridge spool; and (ii) a rewind mechanism for driving said rewind spindle in a rewind direction.

8. An apparatus, as claimed in claim 7, further comprising a third clutch operatively interconnecting said rewind mechanism with said rewind spindle and capable of driving said rewind spindle in said rewind direction and not capable of driving said rewind spindle in said advance direction.

9. An apparatus, as claimed in claim 1, wherein said means for simultaneously driving is manually drivable.

10. A method for moving film out of a thrust cartridge, the cartridge including a cartridge spool, and the cartridge being loaded into a camera having a take-up spool, said method comprising the steps of:

(a) inserting a thrust cartridge into a camera body;

(b) rotating the cartridge spool in an advance direction to thrust film from the cartridge at a first speed; and (c) rotating the take-up spool, simultaneously with said step of rotating the cartridge spool, in an advance direction such that a surface of the take-up spool is at a second speed greater than the first speed, wherein the cartridge spool and the take-up spool are operatively interconnected with first and second one-way clutches, respectively, wherein said first and second clutches are operatively interconnected with a drive mechanism, and wherein said steps of rotating the cartridge spool and rotating the take-up spool comprise the steps of moving the drive mechanism and engaging the first and second clutches.

11. A method for moving film, as claimed in claim 10, further comprising the steps of:

(d) moving the film toward the take-up spool;

(e) securing the film to the take-up spool; and (f) accelerating the rotational speed of the cartridge spool relative to the rotational speed of the take-up spool such that the first speed of the film from the cartridge is about equal to the surface speed of the take-up spool.

12. A method for moving film, as claimed in claim 11, wherein said step of accelerating comprises disengaging the first clutch.

13. A method for moving film, as claimed in claim 11, further comprising the step of rotating the cartridge spool in a rewind direction to rewind the film into the cartridge.

14. A method for moving film, as claimed in claim 13, wherein said step of rotating the cartridge spool in a rewind direction comprises the step of disengaging the second clutch.

15. An apparatus for moving film, said apparatus comprising:
   (a) a camera body adapted to receive a thrust film cartridge;
   (b) a thrust spindle for engagedly receiving a thrust cartridge spool;
   (c) a take-up spool;
   (d) a manual advancing mechanism accessible from an exterior of said camera body and operatively interconnected with said thrust spindle for allowing manual rotation of said thrust spindle in an advance direction to provide film advance; wherein said manual advancing mechanism comprises a device selected from the group consisting of a ratchet lever, and a drive wheel; and
   (e) means for transferring film advance from a thrusting action of said thrust spindle to a pulling action of said take-up spool.

16. An apparatus, as claimed in claim 15, further comprising:
   (f) a rewind spindle for engagedly receiving the thrust film cartridge spool;
   (g) a rewind mechanism for allowing manual driving of said rewind spindle in said rewind direction.

17. An apparatus, as claimed in claim 16, further comprising:
   (h) a one-way clutch operatively positioned between said rewind mechanism and said rewind spindle to allow said rewind mechanism to drive said rewind spindle in said rewind direction while substantially preventing said rewind mechanism from driving said rewind spindle in said advance direction.

18. An apparatus, as claimed in claim 15, wherein said manual advancing mechanism comprises:
   (i) a drive mechanism operatively interconnected with both said thrust spindle and said take-up spool;
   (ii) a first one-way clutch operatively positioned between said drive mechanism and said thrust spindle to allow said drive mechanism to drive said thrust spindle in said advance direction while substantially preventing said drive mechanism from driving said thrust spindle in a rewind direction; and
   (iii) a second one-way clutch operatively positioned between said drive mechanism and said take-up spool to allow said drive mechanism to drive said take-up spool in said advance direction while substantially preventing said drive mechanism from driving said take-up spool in said rewind direction.

* * * * *